Nov. 4, 1924.
J. S. SMYSER
ELECTRICAL APPARATUS
Filed May 29, 1922
1,514,592
2 Sheets-Sheet 1
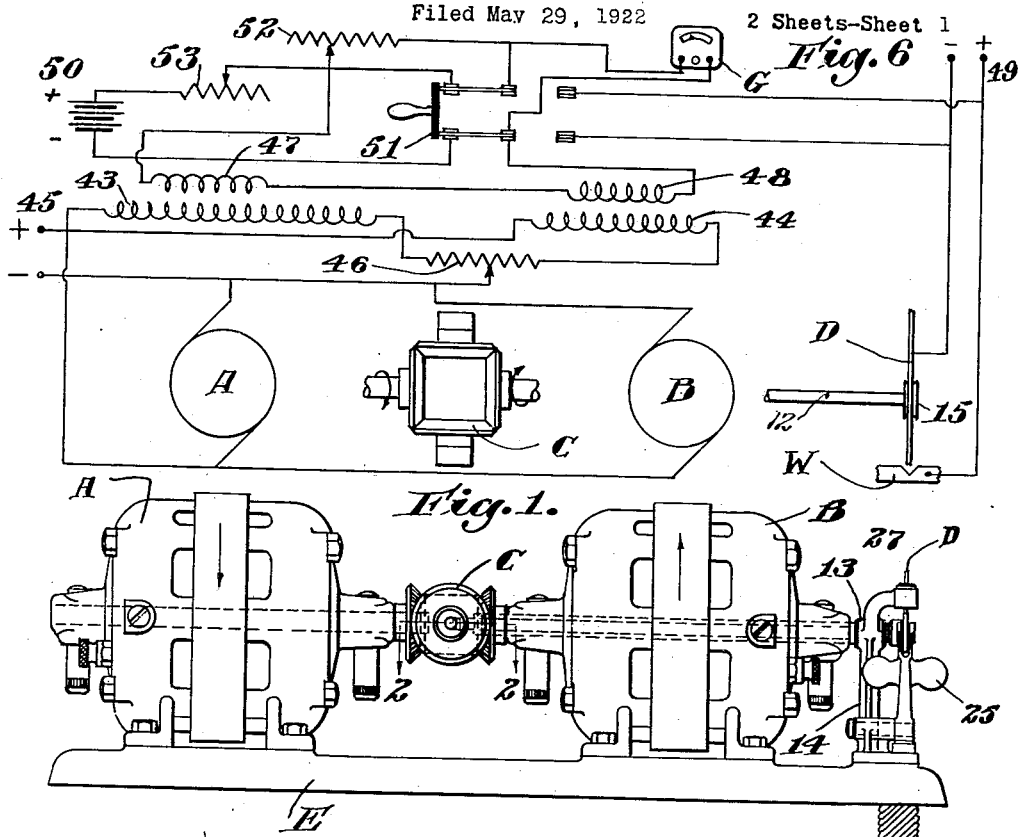
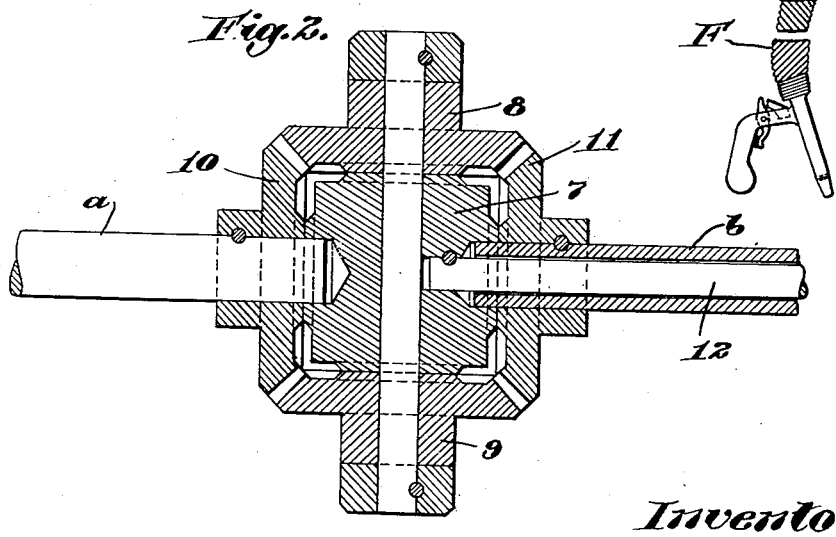
Inventor
James S. Smyser
by Roberts, Roberts & Cushman
Attorneys

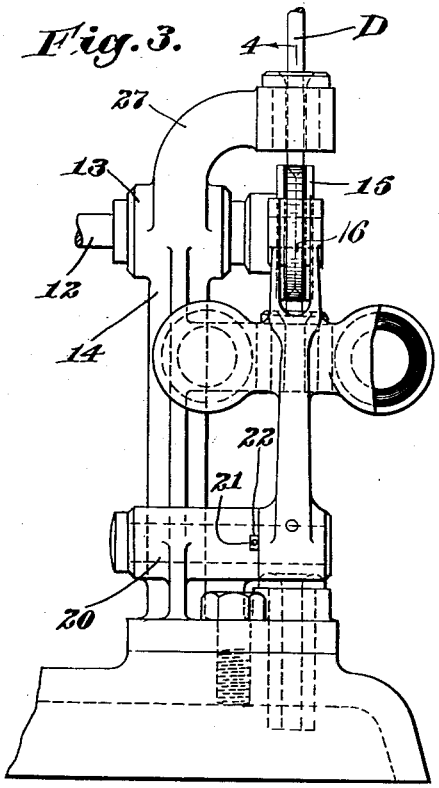
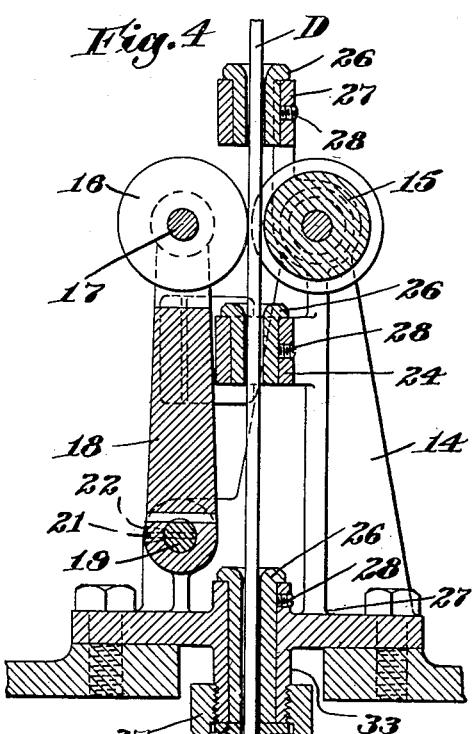
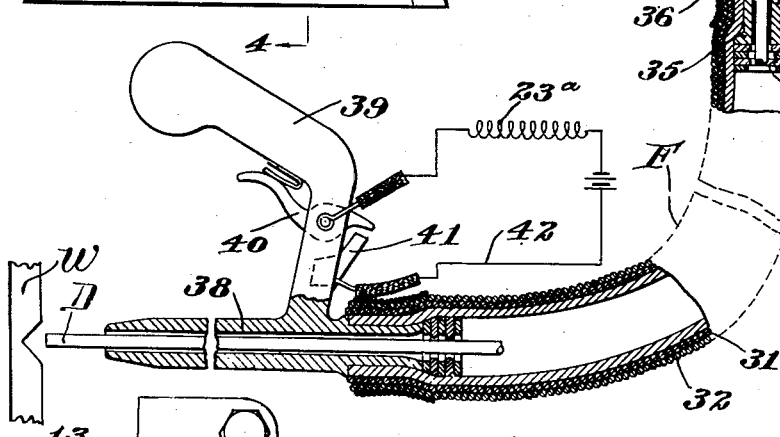
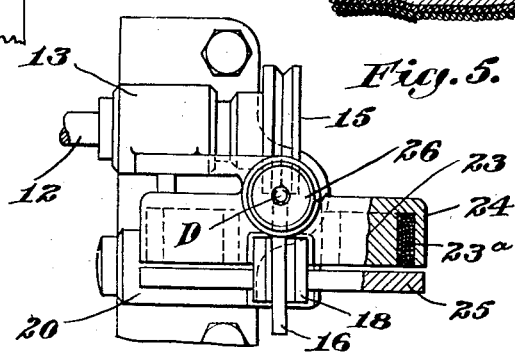

Patented Nov. 4, 1924.

1,514,592

UNITED STATES PATENT OFFICE.

JAMES S. SMYSER, OF HARWICH, MASSACHUSETTS.

ELECTRICAL APPARATUS.

Application filed May 29, 1922. Serial No. 564,303.

*To all whom it may concern:*

Be it known that I, JAMES S. SMYSER, a citizen of the United States of America, and resident of Harwich, in the county of Barnstable and State of Massachusetts, have invented new and useful Improvements in Electrical Apparatus, of which the following is a specification.

This invention pertains to electrical apparatus and relates more particularly to means for regulating, controlling or indicating the operation of electrical or electrically energized apparatus employing electricity in any of its various manifestations including electro-magnetism, heat, radiant energy, etc.

In such apparatus it is frequently desirable to maintain a substantially constant potential in a given circuit, or by means of the electro-magnetic or other effects of such circuit to position or maintain a movable part or element in given location dependent upon the potential in such circuit, and the principal object of the present invention is to provide means whereby such desired results may be obtained automatically in a simple, accurate and reliable manner.

To this end the invention comprises the employment of a movable part or element whose position corresponds with and may in some exemplifications control the potential in the circuit through the apparatus to be regulated or under observation, such circuit hereinafter being referred to as the controlled or principal circuit, together with electro-magnetic means receiving energy from an independent source whose absolute potential, whether constant or varying, is substantially unimportant, and which determines the position of said movable part or element, and means for modifying the action of said electro-magnetic means in accordance with variations in the potential in the controlled or principal circuit.

In its preferred form the invention comprises two electric motors, preferably shunt-wound motors, or other suitable motive means differentially associated with the movable part or element whose position in this preferred embodiment of the invention varies the potential in the controlled or principal circuit, in such manner that the motors are adapted to move and determine the position of said movable part or element, together with means responsive to the potential in the controlled or principal circuit for varying the differential action of said motive means. One or both of the motors have main shunt field windings connected into the controlled or principal circuit, together with one or more auxiliary field windings in addition to the aforesaid windings, the auxiliary windings being in parallel with the controlled or principal circuit and being differentially and cumulatively wound relative to the main field windings of the motors, the windings being so proportioned that the motor fields are substantially equal when the desired current is flowing in the controlled or principal circuit. Means such as variable resistances or other controllers are provided for adjusting the respective fields of the motors to cause the motors to run at exactly the same speed at any desired potential in the controlled or principal circuit whereby any variation in that potential will cause movement of the movable part or element in one or the other direction to correct such variation.

As a specific example of the use of the invention it is herein illustrated as applied to the art of arc welding and in this embodiment of the invention further objects are automatically positively and accurately to control the position of the welding electrode relatively to the work in response to the conditions in the welding circuit, to maintain the arc current substantially constant notwithstanding variations in conditions affecting the arc, to permit adjustment of the apparatus in relation to the arc gap and welding circuit for different classes of work, to control the arc directly in response to the variations in the potential thereof, and in general to improve apparatus of the class described.

In this exemplification of the invention the movable member or element above referred to is the electrode whose position directly determines the length of the arc gap and thus the potential in the welding or controlled circuit, and the shafts of the two motors are connected through differential gearing to means for feeding the electrode either toward or from the work. This particular embodiment of the invention is illustrated by way of example in the accompanying drawings in which:—

Fig. 1 is an elevational view of an apparatus embodying the present invention, the electrical connections being omitted;

Fig. 2 is an enlarged detail sectional view on the line 2—2 of Fig. 1;

Fig. 3 is an enlarged elevational view of the portion of the apparatus shown at the extreme right of Fig. 1;

Fig. 4 is a sectional view on the line 4—4 of Fig. 3 showing the arc electrode in place and the flexible guide therefor;

Fig. 5 is a plan view of the part shown in Fig. 3; and

Fig. 6 is a wiring diagram for the apparatus.

The embodiment of the invention shown for the purpose of illustration comprises a pair of motors A and B having their axes $a$ and $b$ in alignment and mechanically connected by differential gearings C to control the movement of an arc electrode D, the said apparatus being mounted upon a suitable base E. The differential comprises a bearing block or follower 7 supported by the ends of shafts $a$ and $b$ and having pinions 8 and 9 mounted for rotation upon the opposite sides of the block 7, these pinions being interconnected by differential gears 10 and 11 fast upon the shafts $a$, $b$ respectively. Motors A and B are adapted to be rotated in opposite directions and when so operated at unequal speeds, differential bearing block or follower 7 will be caused to rotate in one direction or the other depending upon which motor is rotating at the higher speed.

This movement of the differential is made use of for advancing or retracting arc electrode D through the provision of a shaft 12 fast to differential block 7 to rotate therewith and extending axially through shaft $b$ of motor B, the shaft $b$ being bored out to receive shaft 12. The free end of shaft 12 is supported in a bearing 13 on a bracket 14 fast to base E adjacent motor B as shown in Fig. 1. Shaft 12 extends beyond bearing 13 and has fast thereto a grooved wheel or pulley wheel 15 which is effective to feed arc electrode D when the electrode is held thereagainst by a guide roller 16 as indicated in Fig. 4. Guide roller 16 is mounted for free rotation on shaft 17 supported on arm 18 which is fast to a pivot 19 rotatable in bearing 20 adjacent the base of bracket 14. Swinging movement of arm 18 is limited by a pin 21 fast in pivot 19 and extending into a slot or recess 22 in bearing 20. Arm 18 normally swings by gravity to a position in which the roller 16 is out of contact with arc electrode D. The means for actuating arm 18 to cause roller 16 to press against arc electrode D to hold it in contact with pulley wheel 15 comprises a pair of electromagnets 23 having windings 23$^a$ mounted in recesses in a support 24 fast upon bracket 14 and acting upon armature 25 on arm 18.

Arc electrode D, which in the preferred form comprises welding wire mounted on a suitable reel (not shown), is directed between pulley wheel 15 and the guide roller 16 by suitable guides in the form of bushings 26 of insulating material supported on arm 27 at the top of bracket 14, on the magnet support 24 and in the base 27 of the bracket 14. These bushings may be securely clamped in place by set screws 28. To completely insulate electrode D from the rest of the device, guide wheels 15 and 16 which contact and feed the electrode forward or backward are also partially or wholly of insulating material of a similar or different kind than that used in bushing 26, such as hard rubber or bakelite.

No attempt is made in the drawings to illustrate the different ways in which the apparatus may be mounted for use on various kinds of welding work. According to circumstances, the base E supporting the apparatus may be mounted upon rollers or skids or in any other suitable manner for movement either manually or automatically relative to the work or the apparatus may be stationary and the work moved relative thereto. In certain cases it may be necessary or desirable to have both the work and the apparatus stationary and to carry the arc electrode to the work. For this purpose suitable flexible guide means is necessary to enclose and support the free end of the electrode. A preferred form of flexible guide for the electrode is diagrammatically indicated at F in Fig. 1 and disclosed in detail in Fig. 4 and comprises a plurality of insulating members 29 and 30 which may take the form of disks of insulating material having perforations 29$^a$ and 30$^a$ therethrough centrally disposed or otherwise through which the electrode D extends. These disks are preferably alternately of resilient and non-resilient insulating material such as rubber and bakelite, members 30 as shown, being of bakelite and members 29 of rubber. As indicated the perforations 29$^a$ in the rubber disks are larger than the perforations 30$^a$ of the bakelite disks, whereby the bakelite disks serve to guide the electrode and the rubber disks permit the guide to be flexed. These disks 29 and 30 are held in juxtaposed relation by a suitable casing 31 preferably tubular to fit the outside dimensions of the disk and may be of fabric of the heavy woven type commonly used in hose and tire construction. Tubular casing 31 is preferably reinforced in any suitable manner as by wires 32 wrapped or braided thereabout. This flexible guide F is shown as attached to the boss 33 projecting from the base 27 by means of a flanged member 34 of insulating material such as bakelite, one flange 35 forming a collar beyond which casing 31 extends to be made fast thereto, the other flange 36 serving as a retainer for a union nut 37 having threaded engagement with boss 33. Fast upon the free end of flexible guide F is a member 38 also of insulating material such as bakelite and provided with a portion 39 extending transversely therefrom and forming a pistol grip adapted to be grasped by the hand in directing the end of the electrode D into contact with the work. Grip 39 is provided with a spring pressed trigger 40, the upper end of which is normally held out of contact with an element 41 in the electric circuit 42 of which coils 23ª of magnets 23 are a part. Hence, in the normal position of the parts, the circuit through magnets 23 is open and arm 18 in its outermost position does not hold roller 16 against electrode D so that the latter is disconnected from its automatic control.

A preferred method of wiring the apparatus is disclosed in Fig. 6 wherein the work to be operated is diagrammatically indicated at W, the motors at A and B, the electrode at D. The motors A and B are preferably shunt motors having their field windings 43 and 44 respectively in shunt with the motors themselves and supplied from a source of constant potential 45 through a variable resistance 46 so arranged that the connection from one coil enters the variable resistance from one end and the connection from the other coil at the other end. Hence movement of the control contact in variable resistance 46 simultaneously increases the current supplied to one of the windings and decreases the current supplied to the other.

The motors A and B are further provided with auxiliary field windings 47 and 48 connected in series, the circuit through which is arranged to be selectively connected in parallel with the circuit to the arc from a constant current source 49 or with a battery 50 by means of a double throw switch 51. A variable resistance 52 is provided in the auxiliary winding circuit and a similar variable resistance 53 in the circuit from battery 50 to switch 51. A galvanometer or voltmeter G is connected to switch 51 in such a manner as to be in parallel with the circuit through the auxiliary windings 47 and 48 from either source of power.

As indicated in Fig. 6 windings 44 and 48 to motor B are in the same direction so that their effect upon the motor armature is cumulative and windings 43 and 47 to motor A are in the opposite direction so that their effect is differential. In order that the fields of motors A and B may be conveniently adjusted through the variable resistances 46 and 52 to cause the motors to operate at the same speed, coil 43 contains a greater number of windings than coil 44.

By properly proportioning the number of turns in the windings, both shunt and auxiliary, and by properly adjusting the variable resistances 46 and 52, motors A and B may be arranged to rotate at exactly the same speed and hence hold arc electrode D stationary for any predetermined potential of the arc circuit. In practice electrode D is held stationary only during extremely short periods since the arc constantly tends to lengthen due to the fusion of the electrode.

The method of adjusting the fields of the motors, to maintain the arc at the desired potential and the arc electrode at the corresponding distance from the work, is as follows: With the circuit through control magnet 23ª (Fig. 4) open, switch 51 is moved to the position shown in Fig. 6. Relative adjustments are made in variable resistances 52 and 53 until voltmeter G registers the desired voltage. Variable resistance 46 is then adjusted to vary the current passing through windings 43 and 44 until motors A and B are rotating at the same speed which is indicated by absence of movement of follower 7. The field windings of the motors having been properly adjusted to the predetermined voltage switch 51 is thrown to the right to connect the auxiliary windings in parallel with the welding circuit and the apparatus is ready for the welding operation.

When electrode D is then brought in contact with work W to strike the arc, the potential in the arc circuit is reduced causing less current to flow through the auxiliary coils 47 and 48 and unbalancing the fields of the two motors. The field of motor B will accordingly be weakened since auxiliary coil 48 assists coil 44 less than formerly, but the field of motor A will be strengthened since auxiliary coil 47 will offer less opposition to coil 43. Hence, the speed of motor A will decrease and that of motor B will increase. Thus if the direction of rotation of the respective motors is properly predetermined (motor A counter-clockwise and motor B clockwise, facing the electrode end of the apparatus, Fig. 1), the difference in speed of rotation will cause pinions 8 and 9 together with bearings block 7 to revolve about the common axis of the motors and to rotate grooved wheel or feed wheel 15 in the proper direction to retract the electrode from the work until the potential in the arc circuit reaches the predetermined point, it being understood that the trigger switch 40 is closed when the arc is struck to put the electrode under the control of the motors. If the arc gap becomes too great so that a potential greater than the predetermined one is built up, the action of the motors just described will be reversed and the electrode will be advanced until the potential again approximates the normal. In this case more current than usual will be forced through the auxiliary coils 47 and 48 so that the field of motor B will become stronger due to the cumulative effect of the windings while the field of motor A will become weaker due to the differential effect of its windings.

From the foregoing it will be evident that the electrode is controlled directly in response to variations in the potential between the arc terminals and that the electrode is automatically moved either toward or from the work as is required to maintain the potential constant whereby the arc is quickly and accurately restored to normal condition if for any reason it is accidentally varied from normal. In practice it is found that due to the rapid changes in potential between the arc terminals in response to slight variations in the arc gap, the automatic control mechanism for the electrode herein disclosed acts instantly, smoothly, and without perceptible lag. Furthermore, the arrangement of the auxiliary field windings in parallel with the arc circuit causes only a relatively small current to flow therethrough, so that no adjustments are necessary in the winding circuit for any strength of arc current since the heavy arc current does not pass therethrough as in a series connection. It will be further evident that the provision of a second circuit, to which the auxiliary field windings may be connected and in which any desired voltage may be maintained, permits accurate adjustment of the field windings of the motors to cause the latter automatically to feed the welding electrode toward or from the work to maintain a predetermined potential across the arc gap.

I claim:

1. Apparatus of the class described comprising two electric motors differentially associated with a movable element to move said element oppositely in either direction, an electric circuit whose resistance is varied by movement of said element, and means including windings in parallel with said circuit for controlling the differential action of said motors to maintain the position of the movable element.

2. Electric welding apparatus comprising two electric motors differentially associated with the arc electrode to move the electrode longitudinally in either direction, and means including field windings in parallel with the arc for controlling the differential action of the respective motors to maintain the position of the electrode.

3. Apparatus of the class described comprising oppositely rotating electric motors differentially operative upon a movable element, an electrical circuit whose resistance is varied by movement of said element, and means for controlling the relative rate of rotation of said electric motors in response to such variations in resistance, thereby to control the position of the movable element.

4. Apparatus of the class described comprising an electrical circuit and a movable part operative to vary the resistance in said circuit, oppositely rotating motors differentially operative upon said movable part to move the latter in opposite directions, and means for controlling the relative rate of rotation of said motors in response to variations in potential in the circuit, said means including windings for the motors connected to said circuit.

5. Electric arc welding apparatus comprising oppositely rotating motors differentially operative on the welding electrode to move the electrode longitudinally to or from the work, and means for controlling the relative rate of rotation of said active means in response to the variations in the length of the arc, said means including windings for said motors connected to the electrode circuit.

6. In combination with an electrical circuit, a part movable to vary the potential in the circuit, oppositely rotating motors differentially operative on said movable part to vary its position, and means for controlling the relative rate of rotation of said motors in response to variations in potential in the circuit, said means including field windings for said motors connected to said circuit.

7. Electric arc welding apparatus comprising oppositely rotating motors differentially operative on the welding electrode to move the electrode longitudinally to or from the work, and means for controlling the relative rate of rotation of said motive means in response to variations in arc potential, said means including windings for said motors connected in parallel with the electrode circuit.

8. Electric arc wilding apparatus comprising opposite rotating motors differentially operative on the welding electrode to move the electrode longitudinally to or from the work, and means for controlling the relative rate of rotation of said motive means in response to variations in the length of the arc, said means including field windings for said motors connected in parallel with the electrode circuit.

9. In combination with an electrical circuit, a part movable to vary resistance in the circuit, shunt motors differentially operative on said movable part to move it in opposite directions, and means for controlling the relative rate of rotation of said motors in response to variations in potential in the circuit, said means including windings differentially and cumulatively associated with the shunt windings of said motors respectively.

10. Electric arc welding apparatus comprising shunt motors differentially operative on the welding electrode to move the electrode longitudinally to or from the work, and means for controlling the relative rate of rotation of said motors in response to variations in arc potential, said means including windings differentially and cumulatively associated with the shunt winding of said motors respectively, and connected in parallel with the arc.

11. In combination with an electrical circuit, a member movable to vary the resistance in the circuit, a pair of motors, differential gearing mechanically connecting the shafts of said motors, means operable by the differential gearing for moving said movable member, and means responsive to varying potential in the circuit for affecting the operation of the motors.

12. Electric arc welding apparatus comprising opposed motors, differential gearing mechanically connecting the shaft of said motors, a follower in said gearing, a member fast to said follower extending axially through one of said shafts, means upon the free end of said member for advancing or retracting the arc electrode, and means including field coils in circuit with the arc for affecting the operation of the motors thereby to control the feeding of the electrode in response to the condition of the arc circuit.

13. In a device of the class described, a pair of motors connected in one circuit for rotation in opposite directions, differential gearing mechanically connecting said motors, a differential follower in said gearing for indicating differences in the movements of said motors, and a second circuit including windings for the respective motors and constructed and arranged differentially to affect the operation of the motors in response to fluctuation in potential in said second circuit.

14. In a device of the class described, a pair of shunt motors connected in one circuit for rotation in opposite directions, differential gearing mechanically connecting said motors, a differential follower in said gearing for indicating differences in the movements of said motors, and a second circuit comprising auxiliary coils adapted to strengthen the field of one of said motors and to weaken the field of the other motor whereby differentially to affect the operation of the motors in response to fluctuation in potential in said second circuit.

15. In a device of the class described, a pair of motors connected in one circuit for rotation in opposite directions, differential gearing mechanically connecting said motors, a differential follower in said gearing for indicating differences in the movements of said motors, and means responsive to fluctuations in potential in a second circuit for strengthening the field of one of said motors to thereby make the movement of said follower responsive to potential conditions in said second circuit.

16. In a device of the class described, a pair of motors connected in one circuit for rotation in opposite directions, differential gearing mechanically connecting said motors, a differential follower in said gearing for indicating differences in the movements of said motors, and means responsive to fluctuations in potential in a second circuit for weakening the field of one of said motors to thereby make the movement of said follower responsive to potential conditions in said second circuit.

17. Electric arc welding apparatus comprising an electrode controller for positioning the electrode relatively to the work, means for connecting said controller to the arc circuit to be operated thereby, and an auxiliary circuit to which said controller may be connected to adjust the controller to maintain the electrode at a predetermined distance from the work before striking the arc.

18. Electric arc welding apparatus comprising an electrode controller arranged to be connected in parallel with the arc to maintain a predetermined potential across the arc, and an auxiliary circuit including a source of current to which the controller may be connected before striking the arc to adjust the controller to maintain said potential when the arc is struck.

19. Electric arc welding apparatus comprising means for automatically positioning the electrode relatively to the work, said means including an electric motor having a field winding in parallel with the arc, and means for making a preliminary adjustment of the winding to cause said motor to position the electrodes so as to maintain a predetermined potential across the arc, said second means comprising a circuit having the desired potential and independent of the arc circuit arranged to be connected to said winding prior to striking the arc.

20. Electric welding apparatus comprising two motive means differentially associated with the arc electrode to move the electrode longitudinally in either direction, means responsive to the arc controlling the differential action of said means to maintain the position of the electrode, and means distinct from the arc circuit for making a preliminary adjustment of said second means to cause the apparatus to move the electrode in a manner to maintain a predetermined potential across the arc.

21. Electric welding apparatus comprising two motor means differentially associated with the arc electrode to move the electrode longitudinally in either direction, means including windings in parallel with the arc for controlling the differential action of said means to maintain the position of the electrode, and means distinct from the arc circuit for making a preliminary adjustment of said windings to cause the apparatus to move the electrode in a manner to maintain a predetermined potential across the arc.

22. Electric arc welding apparatus comprising oppositely rotating motors differentially operative on the welding electrode to move the electrode longitudinally to or from the work, means for controlling the relative rate of rotation of said motive means in response to the arc, said means including field windings for said motors, connected in parallel with the electrode circuit, and a second circuit arranged to be selectively connected to said windings to effect a preliminary adjustment of said windings to cause the apparatus to move the electrode in a manner to maintain a predetermined potential across the arc.

23. Electric arc welding apparatus comprising shunt motors differentially operative on the welding electrode to move the electrode longitudinally to or from the work, means for controlling the relative rate of rotation of said motors in response to the arc, said means including windings differentially and cumulatively associated with the shunt windings of said motors respectively, and means for connecting said windings to a source of known potential to effect an adjustment of said windings whereby the apparatus will feed the electrode at a rate to maintain the arc at a desired potential.

24. Electric arc welding apparatus comprising shunt motors differentially operative on the welding electrode to move the electrode longitudinally to or from the work, means for controlling the relative rate of rotation of said motors in response to the arc, said means including windings differentially and cumulatively associated with the shunt windings of said motors respectively and connected in parallel with the arc, means for accurately adjusting the strength of said windings to cause the apparatus to maintain the arc at a predetermined potential, said last named means comprising a circuit arranged to be selectively connected to said windings and to have said predetermined potential.

25. Electric arc welding apparatus comprising shunt motors differentially operative on the welding electrode to move the electrode longitudinally to or from the work, means for controlling the relative rate of rotation of said motors in response to the arc, said means including windings differentially and cumulatively associated with the shunt windings of said motors respectively and connected in parallel with the arc, variable resistances in both said shunt and field windings, and means comprising a circuit arranged to be connected to said field windings and to operate at any desired potential whereby said resistances may be adjusted prior to closing the welding circuit so that the apparatus will maintain the arc at a predetermined potential.

26. Electric arc welding apparatus comprising shunt motors differentially operative on the welding electrode to move the electrode longitudinally to or from the work, means for controlling the relative rate of rotation of said motors in response to the arc, said means including windings differentially and cumulatively associated with the shunt windings of said motors respectively and connected in parallel with the arc, variable resistances in both said shunt and field windings, and means comprising a circuit arranged to be connected to said field windings and having a variable resistance and a voltmeter whereby all said resistances may be adjusted to maintain said electrode stationary at a predetermined potential in the field windings whereby when the welding circuit is closed the apparatus will maintain the arc at said predetermined potential.

Signed by me at Boston, Mass., this 24th day of April, 1922.

JAMES S. SMYSER.

Certificate of Correction.

It is hereby certified that in Letters Patent No. 1,514,592, granted November 4, 1924, upon the application of James S. Smyser, of Harwich, Massachusetts, for an improvement in "Electrical Apparatus," errors appear in the printed specification requiring correction as follows: Page 3, line 116, for the word "bearings" read *bearing;* page 4, line 84, claim 5, for the word "active" read *motive*, and line 85, strike out the article "the", first occurrence; same page, line 109, claim 8, for the misspelled word "wilding" read *welding*, and line 110, for the word "opposite" read *oppositely;* and that the said Letters Patent should be read with these corrections therein that the same may conform to the record of the case in the Patent Office.

Signed and sealed this 23d day of December, A. D. 1924.

[SEAL.]

KARL FENNING,
*Acting Commissioner of Patents.*